United States Patent [19]

Sumal

[11] Patent Number: 4,616,506
[45] Date of Patent: Oct. 14, 1986

[54] APPARATUS FOR MEASURING THE MASS OF A FLOWING MEDIUM AND METHOD FOR PRODUCING AN APPARATUS FOR MEASURING THE MASS OF A FLOWING MEDIUM

[75] Inventor: Jaihind S. Sumal, Vaihingen/Ensingen, Fed. Rep. of Germany

[73] Assignee: Robert Bosch GmbH, Stuttgart, Fed. Rep. of Germany

[21] Appl. No.: 795,731

[22] Filed: Apr. 18, 1985

Related U.S. Application Data

[63] Continuation of Ser. No. 486,764, Apr. 20, 1983, abandoned.

[30] Foreign Application Priority Data

Aug. 11, 1982 [DE] Fed. Rep. of Germany ....... 3229844

[51] Int. Cl.$^4$ ................................................ G01F 1/68
[52] U.S. Cl. ...................................... 73/204; 338/312
[58] Field of Search .................... 73/204; 29/610, 612, 29/621; 338/307–309, 322, 324, 329

[56] References Cited

U.S. PATENT DOCUMENTS

| | | | |
|---|---|---|---|
| 3,452,314 | 6/1969 | Sapoff et al. ......................... | 338/309 |
| 3,452,432 | 7/1969 | Manley ................................. | 29/621 |
| 3,626,353 | 12/1971 | Loose ................................. | 338/312 |
| 3,900,819 | 8/1975 | Djorup ................................. | 73/204 |
| 4,024,761 | 5/1977 | Djorup ................................. | 73/204 |
| 4,213,335 | 7/1980 | Peter et al. ........................... | 73/204 |
| 4,316,171 | 2/1982 | Miyabayshi et al. ............... | 338/309 |
| 4,366,709 | 1/1983 | Eiermann et al. ................... | 73/204 |
| 4,373,387 | 2/1983 | Nishimura et al. .................. | 73/204 |
| 4,396,899 | 8/1983 | Ohno ................................... | 338/308 |
| 4,448,070 | 5/1984 | Ohyama et al. ...................... | 73/204 |

Primary Examiner—Herbert Goldstein
Attorney, Agent, or Firm—Edwin E. Greigg

[57] ABSTRACT

An apparatus for measuring the mass of a flowing medium and a method for producing the apparatus are proposed in which a plate-like carrier on which at least one resistance coating is applied. Continuous fastening openings are provided in the carrier and the resistance coating such that they extend parallel to one another and at the same distance from one edge of the carrier. Rigid electrical connections are inserted through the fastening openings and are soldered provisionally with the resistance coating. A source of current is applied to each of the electrical connections for heating the connections to such an extent that the solder between the electrical connections and the resistance coating melts, causing the carrier located in a steady laminar flow to rotate into a streamlined position. The heating current is then interrupted, and the solder, as it sets, fixes the carrier in this streamlined position at the electrical connections.

6 Claims, 2 Drawing Figures

APPARATUS FOR MEASURING THE MASS OF A FLOWING MEDIUM AND METHOD FOR PRODUCING AN APPARATUS FOR MEASURING THE MASS OF A FLOWING MEDIUM

This is a continuation of application Ser. No. 486,764 filed Apr. 20, 1983, now abandoned.

BACKGROUND OF THE INVENTION

The invention is based on an apparatus for measuring the mass of a flowing medium as defined generally hereinafter. In apparatuses of this type, the problem exists of securing the temperature-dependent resistor in such a manner that the least possible amount of heat is conducted via the holder, in order to assure rapid response times on the part of the apparatus. Furthermore, the temperature-dependent resistor should be disposed in the flow of the medium in as streamlined a manner as possible to prevent flow separations and associated undesirable changes in the measuring characteristic of the apparatus and to prevent excessive mechanical strain.

OBJECT AND SUMMARY OF THE INVENTION

The apparatus and method according to the invention have the advantage over the prior art in that the apparatus has a very high speed of response to changes in the flow of the medium, and that the temperature-dependent resistor is disposed in a streamlined manner in the flow.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
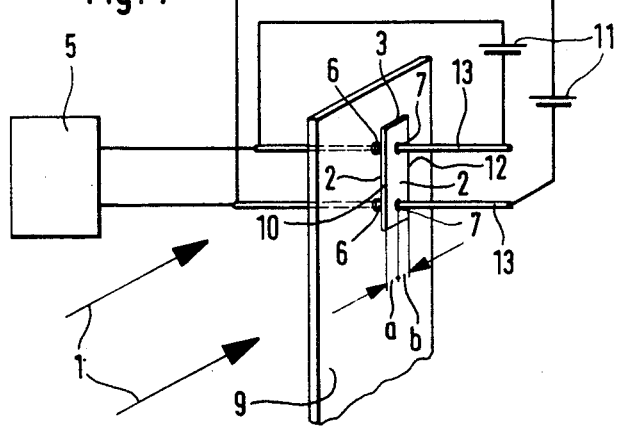
FIG. 1 shows a first exemplary embodiment of an apparatus for measuring a flowing medium.

In FIG. 1, in a flow of a medium indicated by arrows 1 and which by way of example is the aspirated air in the intake tube of an internal combustion engine, at least one temperature-dependent resistor 2 is disposed in the form of a film or coating applied to a plate-like carrier 3; this resistor 2 serves to measure the mass of the flowing medium. To this end, the temperature-dependent resistor 2 is supplied with electric current in a known manner by means of an electronic regulating circuit 5 in such a way that it assumes a constant temperature. When an apparatus of this kind is used to measure the aspirated air mass in an internal combustion engine, stringent demands are made on the apparatus in terms of the speed and accuracy of measurement, because where the aspirated air masses are changing rapidly such changes must be ascertained as quickly as possible by the apparatus so that the quantity of fuel to be delivered can be adapted appropriately. It is therefore advantageous for the heat absorption capacity of the carrier 3 and the temperature-dependent resistor 2 to be kept as low as possible, and furthermore that the least possible amount of heat can be conducted by the holder means for the carrier 3 and the temperature-dependent resistor 2, thus producing the shortest possible response time to changes in the mass of the flow of medium.

In accordance with the invention, it is therefore provided that the carrier 3, along with the temperature-dependent resistor 2 which may be disposed such that it extends in the flow direction 1 at either side of the carrier 3, should be supported in the flow by means of rigid electrical connections 6. The electrical connections 6 are connected to the electronic regulating circuit 5. They may be embodied as rigid wires, which protrude through fastening openings 7 in the carrier 3 and the resistance coatings 2 and are soldered to the resistance coatings 2. The electrical connections 6 are disposed not one behind the other in the flow of medium but rather such that they extend crosswise to the flow direction 1 and parallel to one another in the flow of medium 1, thus assuring the least possible conduction of heat from the carrier 3 and the resistance coating 2. Remote from the carrier 3, the electrical connections 6 are secured in a holder body 9, which may by way of example be embodied as a plate extending in the flow direction 1.

Ordinarily it is difficult to dipose the carrier 3 with the resistance coatings 2 in a plane extending in as streamlined a manner as possible with respect to the flow direction 1, such as to prevent excessive mechanical strains and flow separations which cause changes in the measurement characteristic of the apparatus. In order to attain the most streamlined possible orientation on the part of the carrier 3 and the resistance coatings 2, the invention proposes that the carrier body 3 and the resistance coatings 2 are provided with fastening openings 7 passing all the way through; these openings 7 extend parallel to one another and to one edge 10 of the carrier 3, with the given distance "a" between the center line of the fastening openings 7 and the edge 10 being identical in each case. Each electrical connection 6, which is secured at one end of the holder body 9, is guided on the other end through one fastening opening 7 and provisionally soldered to the resistance coating 2. Now the carrier 3, held on the holder body 9 with the electrical connections 6, is disposed vertically in a steady, laminar flow of medium 1, this being effected such that the electrical connections 6 come to rest parallel to one another at the same level in the flow, rather than one behind the other in the flow direction. Each electrical connection 6 is now applied separately to a source of electrical current 11 and thus supplied with heating current such that the solder at the fastening openings 7 between the resistance coatings 2 and the electrical connections 6 melts, and the carrier 3 rotates into its most streamlined possible position in the flow of medium 1. Subsequently the heating current from the current sources 11 to the electrical connections 6 is interrupted, and then the most-streamlined position of the carrier 3 in the flow of medium 1 becomes fixed, as a consequence of the setting of the solder at the fastening openings 7.

In order to obtain the maximum possible adjusting force for exertion upon the carrier 3 during this adjustment operation, it is advantageous for the section "a" of the carrier 3 pointing upstream from the electrical connections 6 to be shorter in embodiment than the section "b" of the carrier 3 pointing downstream from the electrical connections 6; in other words, the fastening openings 7 are spaced a shorter distance from the edge 10 than from the edge 12 pointing in the flow direction. The ends 13 of the electrical connections 6 pointout out of the carrier 3 and remote from the holder body 9 may be removed in a suitable manner, for instance being cut off.

Figure 2:
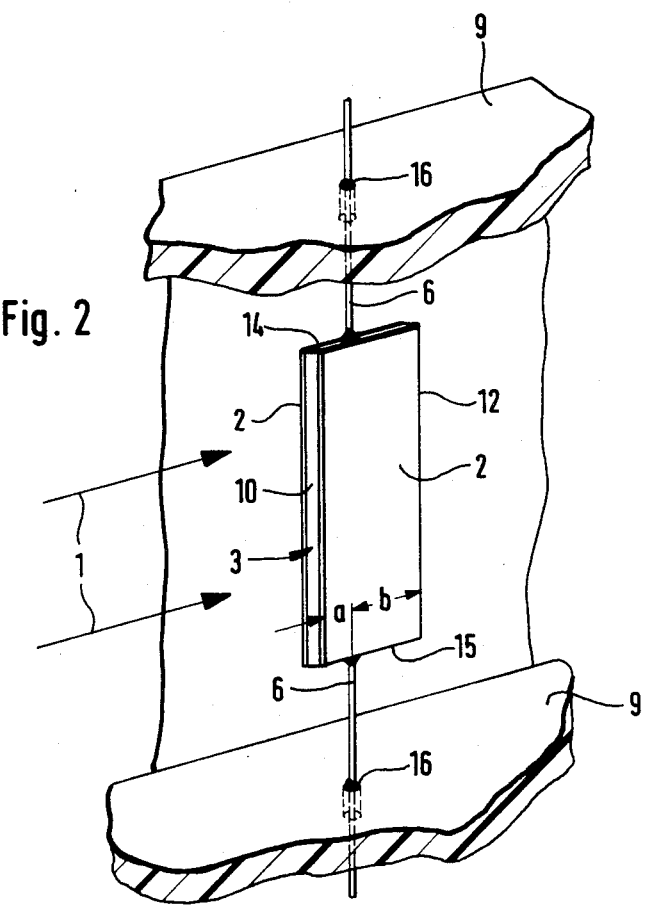
FIG. 2 shows a second exemplary embodiment of an apparatus for measuring a flowing medium.

In the second exemplary embodiment of the invention shown in FIG. 2, the elements having the same function as those in the first exemplary embodiment shown in FIG. 1 are provided with identical reference numerals. One rigid electrical connection 6 is disposed on each end face 14, 15 of the plate-like carrier 3 and is connected to the resistance coating 2 in an electrically conductive manner, for instance by soldering. The electrical conections 6 are oriented such that they are aligned with one another and are at a shorter distance "a" from the edge 10 of the carrier 3 than the distance "b" from the edge 12. The electrical connections 6 are now, with the carrier 3 secured to them, inserted into opposed holder openings 16 of a bracket-like holder body 9, in which they are rotatably supported and in which they hold the carrier in a vertical position. Then the carrier 3 is subjected to a steady laminar flow of medium 1, and it assumes a streamlined position, which is fixed by the fixation of the electrical connections 6 in the holder openings 16 of the holder body, for instance by soldering. The electrical regulation of the resistance coatings 2 may be effected by means of an electronic regulating circuit, as has already been described with respect to the exemplary embodiment of FIG. 1.

With a suitable marking on an arbitrary flow cross section for the holder body 9, the apparatus can now be inserted into any desired flow cross section, with the carrier 3 being oriented in its most streamlined position with respect to the flow, which position needs no longer be vertical. By means of this streamlined orientation of the carrier 3, not only are undesirable flow separations at the carrier 3 prevented, but the mechanical forces exerted by the flow upon the carrier and the electrical connections 6 are also decreased.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An apparatus for measuring the mass of a flowing medium comprising at least one temperature-dependent resistor in a flow of said medium and disposed on a carrier in the form of a resistance coating, said carrier supportable in said flow by means of rigid electrical connections to said resistance coating, further wherein said electrical connections protrude entirely through a fastening opening in said carrier and said resistance coating and are soldered to said resistance coating.

2. An apparatus as defined by claim 1, wherein said said electrical connections, extend crosswise to the flow and are disposed parallel to one another in said flow.

3. An apparatus as defined by claim 2, wherein the extension of said carrier upstream of said electrical connections is shorter than the extension downstream of said connections.

4. An apparatus as defined by claim 3, wherein said electrical connections are secured to a holder body and the ends of said connections being remote from said carrier.

5. An apparatus for measuring the mass of a flowing medium comprising at least one temperature-dependent resistor in a flow of said medium and disposed on a carrier in the form of a resistance coating, said carrier supportable in said flow by means of at least two rigid electrical connections, said electrical connections being oppositely disposed in alignment with one another asymmetrically with respect to a longitudinal axis of said carrier and extending crosswise to said flow so as to define an upstream portion and a downstream portion of said carrier, said downstream portion being the larger of said portions, and each of said connections terminating in a respective end face of said carrier and soldered to said resistance coating.

6. An apparatus as defined by claim 5, wherein said electrical connections are secured to a holder body and the ends of said connections being remote from said carrier.

* * * * *